United States Patent [19]
Nielson

[11] Patent Number: 5,830,593
[45] Date of Patent: Nov. 3, 1998

[54] ROTATING ELECTRODE FUEL CELL FOR VEHICLE PROPULSION

[76] Inventor: Jay P. Nielson, 3490 Monte Verde Dr., Salt Lake City, Utah 84109

[21] Appl. No.: 584,553

[22] Filed: Jan. 11, 1996

[51] Int. Cl.$^6$ ..................................................... H01M 8/06
[52] U.S. Cl. ............................... 429/38; 429/15; 429/17; 429/34; 429/40; 180/653
[58] Field of Search .................................. 429/14, 15, 17, 429/25, 34, 38, 40; 180/65.3

[56] References Cited

U.S. PATENT DOCUMENTS

| | | | |
|---|---|---|---|
| 4,824,534 | 4/1989 | Tetzlaff et al. | 204/128 |
| 5,476,730 | 12/1995 | Okamura et al. | 429/27 |
| 5,543,238 | 8/1996 | Strasser | 429/17 |

OTHER PUBLICATIONS

Keith R. Williams, ed., *An Introduction to Fuel Cells*, Elsevier Publishing Company, New York, 1966, pp. 94 and 95 (month N/A).

J. F. McElroy, et al., "SPE Hydrogen/Oxygen Fuel Cells for Rigorous Naval Applications", 34th International Power Sources Symposium, Jun. 25–28, 1990.

*Primary Examiner*—M. Nuzzolillo
*Attorney, Agent, or Firm*—Mallinckrodt & Mallinckrodt

[57] ABSTRACT

A fuel cell system for use in vehicles has a hydrogen electrode assembly, an oxygen electrode assembly, and a body of liquid electrolyte between the hydrogen electrode assembly and the oxygen electrode assembly. The hydrogen electrode assembly has a hydrogen sparger that releases fine bubbles of hydrogen gas into the electrolyte, and a hydrogen catalyst electrode having pores through which flow the electrolyte and bubbles of hydrogen gas.

10 Claims, 7 Drawing Sheets

EQUATIONS
$H_2 + 2KOH + CATALYST \longrightarrow 2H_2O + 2K+ +2e$ AT $-.826$ V.
$2e + H_2O + 1\frac{1}{2} O_2 \longrightarrow 2HO_2-$
$2K + \frac{1}{2} O_2 + 2e$ At $+ .40$ V. $\longrightarrow K_2O$
$K_2O + H_2O \longrightarrow 2KOH \longrightarrow$ RECYCLE
$H_2O + 1/2O_2 + 2e \longrightarrow 2OH-$

SECTION THROUGH PORE - ELEVATION

SECTION THROUGH PORE AT HYDROGEN BUBBLE 114,000 H2 MOLECULES AT ENTRANCE HAVING .2 MICRON SPHERICAL DIAMETER. NEAR ZERO MOLECULES AT EXIT OF A WALL .125 INCHES THICK

LIQUID HYDROGEN STORAGE TANK

ROTATING ELECTRODE FUEL CELL FOR VEHICLE PROPULSION

BACKGROUND OF THE INVENTION

1. Field of the Invention

The invention relates to apparatus for the extraction of electrical energy from the oxidation of hydrogen, or of fuels containing hydrogen, and applying that energy to propelling a vehicle. More specifically, the invention relates to electric vehicle propulsion systems incorporating fuel cells with a liquid hydrogen storage system.

2. Prior Art

Fuel Cell Art

There are many applications for apparatus that converts the stored chemical energy of a fuel and oxidizer into more immediately useful electrical form. The most common form of such apparatus is a heat engine that converts chemical energy to mechanical, in turn driving a generator.

Fuel cells, a technology pioneered by William R. Grove in 1839, perform this conversion of chemical to electrical energy directly, without need for a mechanical energy intermediate. Fuel cells are becoming increasingly popular for converting the chemical energy of a fuel into electrical energy.

A fuel cell operates by introducing a fuel, typically hydrogen, through a first gas permeable electrode into an electrolyte. A catalyst material on the electrode strips electrons from the hydrogen fuel, forming hydrogen ions, which then diffuse toward a second electrode. Similarly, an oxidizer, typically oxygen or a gas mixture such as air containing oxygen, is introduced through the second gas permeable cathode electrode into the electrolyte, where it combines with the hydrogen at a catalytic site on the electrode while absorbing electrons from the electrode. A typical electrolyte is potassium hydroxide (KOH) dissolved in water, although other materials, such as phosphoric acid or perfluorosulfonic acid may be used. Typical catalyst and electrode materials used with a potassium hydroxide electrolyte include nickel, gold or platinum, or nickel with platinum deposited on it. Platinum is a much more active catalyst than is nickel, but is considerably more expensive. The electrodes are typically of spongy or porous texture, such as the Bacon type biporous nickel electrodes described at pages 94 and 95 of Keith R. Williams, ed., *An Introduction to Fuel Cells*, Elsevier, 1966.

Typical fuel cells are arranged as a series of parallel flat plate electrodes immersed in an electrolyte solution. Typically, each porous, conductive, catalytic, electrode is exposed to a gas on one side, and to the electrolyte on the other. One electrode is exposed to a fuel gas such as hydrogen, the other electrode to an oxidizer gas such as oxygen. The gas to liquid interface meniscus usually occurs within the pores of the electrode. The electrolyte often is circulated to remove the reaction products, to control the cell temperature, and to avoid formation of localized concentration gradients within the cells. Alkaline electrolyte fuel cells of this type, operating at 200 degrees, powered the Apollo lunar spacecraft. An alkaline fuel cell having a circulating electrolyte is also described at page 35 of Williams, supra.

J. F. McElroy, et al, SPE Hydrogen/Oxygen Fuel Cells for Rigorous Naval Applications, in 34th International Power Sources Symposium, Jun. 25–28, 1990, report that state of the art perfluorosulfonic acid electrolyte cells have reported current output densities per square foot of cell active area as high as 300 amperes at 0.6 volt, and 500 amperes at 0.5 volt. (A square foot of active area seems to have meant a square foot of anode, with a square foot of cathode) At the later current, these cells are only operating at about 40% of the maximum theoretical efficiency, because the theoretical open circuit cell voltage of oxygen-hydrogen fuel cell is 1.229 volts.

Fuel cells that operate with dissolved fuels have also been reported, one cell of this type is portrayed schematically at page 36 of Williams, supra. In this type of cell, the electrolyte contains a dissolved fuel, that reacts upon a fuel catalyst electrode.

Fuel cells have been made to operate using an oxygen-nitrogen mixture supplied to the oxygen electrode. This is typically accomplished by supplying an excess of the oxygen-nitrogen mixture to the electrode, such that the nitrogen and some unreacted oxygen escapes the electrode to form bubbles within the electrolyte. The bubbles of unreacted nitrogen are then usually gravitationally separated from the electrolyte and allowed to escape from the cell.

Fuel cells pose a number of problems and inefficiencies that must be solved for practical operation;

First, the reactions occurring in a fuel cell are exothermic, requiring removal of heat from the cell when the cell is operated at high power.

Second, less active catalysts such as nickel generally require that the cell be operated at temperatures exceeding 100 degrees C., which requires use of highly concentrated electrolytes and/or high operating pressures to prevent excessive water loss from the electrolyte.

Third, the alkaline electrolyte, including potassium hydroxide, of many types of fuel cells reacts with any carbon dioxide that may be present in the oxygen gas mixture supplied to the oxygen electrode, forming insoluble carbonate and water, clogging the electrolyte passageways.

Fourth, current inefficiency occurs if and when some of the fuel and oxidizer react without generating electricity. Fifth, concentration polarization occurs as reactions occur at each electrode, depleting or enriching the reactants in the electrolyte adjacent to the electrode. Sixth, activation polarization occurs due to the slowness of reactions at the catalytic sites on the electrodes. Seventh, ohmic losses occur as current flows through the electrodes and accompanying connections because the cell operates at a low voltage where currents must be high to convey respectable power, such that even small resistances can cause significant power losses. The impact of these losses on efficiency can be substantial. Thus, inefficiencies resulting from ohmic losses and polarization cause McElroy's cells (previously discussed) to produce only 0.6 volts at 300 amps, half the open circuit voltage of 1.229 volts.

Vehicle Art

Experimental vehicles have been powered by hydrogen-oxygen fuel cell systems. One such vehicle built by General Motors and powered by a hydrogen-oxygen fuel cell system having a liquid oxygen and liquid hydrogen gas supply system is portrayed in schematic form at pages 60 and 61 of Williams, supra.

A commercially available fiber glass blanket insulation for cyrogenic tanks, is made by Schuller International, Inc., of Denver, Colo. under the trademark CRYO LYTE.

SUMMARY OF THE INVENTION

The present invention is an improved fuel cell and fuel cell system that is especially suitable for powering a vehicle, including a vehicle so powered.

The preferred embodiment of the fuel cell system has at least one, preferably twelve, fuel cells each having a porous catalytic fuel electrode and a porous catalytic oxygen electrode immersed in electrolyte. Bubbles of gaseous fuel are injected into the electrolyte through a fuel sparger, reacting at the catalytic electrode. Bubbles of oxygen are injected into the cell through an oxygen sparger. The catalytic electrodes rotate to force the electrolyte and bubbles through the pores of the electrodes. Each cell also has a filter for removal of carbonate from the electrolyte.

Because the fuel cell operates at pressures greater than ambient and air is the cheapest and most abundant source of oxygen available, the fuel cell system has a pressurization and purification system for air.

It is desirable that the cell system be provided with an expander for extracting energy from expansion of unreacted nitrogen that must be vented from the cell when high pressure is employed.

The cell system also comprises a storage system for hydrogen fuel and a variable speed motor assembly for rotating the electrodes; the electrodes being rotated at approximately 40 RPM when there is no load on the system and at approximately 1800 RPM when there is a substantially full load on the system.

The storage system for hydrogen fuel comprises an inner tank, an inner infrared reflector, an outer tank where the space between the inner tank and the outer tank is evacuated, an outer infrared reflector, and insulation. The storage system further comprises an inlet for hydrogen liquid, and an outlet whereby hydrogen gas may be reclaimed during filling of the tank. The storage system also has an automatic transfer valve, whereby hydrogen for vehicle operation may be drawn from hydrogen gas in the tank when the tank is at high pressure, or from hydrogen liquid in the tank when the tank is at low pressure; again the storage system, includes a heat exchanger and a metering pump that feeds the fuel cell system.

The vehicle comprises an electric vehicle propulsion system preferably comprising an electric drive motor for each wheel of the vehicle. It further comprises inverter electronics for conversion of the approximately twelve to fourteen volts developed by the twelve cell fuel system into a suitable voltage for powering the vehicle propulsion system. The fuel cell system maybe supplemented with a peaking battery system for periods of high acceleration. The vehicle body and suspension system are conventional.

The vehicle is operated in conjunction with a network of servicing stations having facilities to refill the hydrogen fuel tank with liquid hydrogen, and to remove carbonate from the filters.

THE DRAWINGS

The best mode presently contemplated for carrying out the invention is illustrated in the accompanying drawings, in which:

FIG. 1 is a side elevation, partly in vertical section, of one of a plurality of rotating electrode fuel cells of the present invention;

FIG. 2, a vertical section of a prior art fuel cell of ordinary design;

FIG. 3, a top plan view of the fuel cell system of FIG. 1, showing a twelve cell array;

FIG. 4, a view in vertical section showing a pore in the hydrogen catalyst electrode of one of the rotating electrode fuel cells of FIGS. 1 and 3;

FIG. 5, a similar view in horizontal section of a pore in the hydrogen catalyst electrode of the rotating electrode fuel cell of FIGS. 1, 3, and 4;

FIG. 6, a schematic view of the hydrogen storage and supply subsystem of the fuel cell system of the present invention; and FIG. 7, a schematic view of a vehicle propulsion system based upon the rotating electrode fuel cell.

DETAILED DESCRIPTION OF THE ILLUSTRATED EMBODIMENTS

Figure 6:
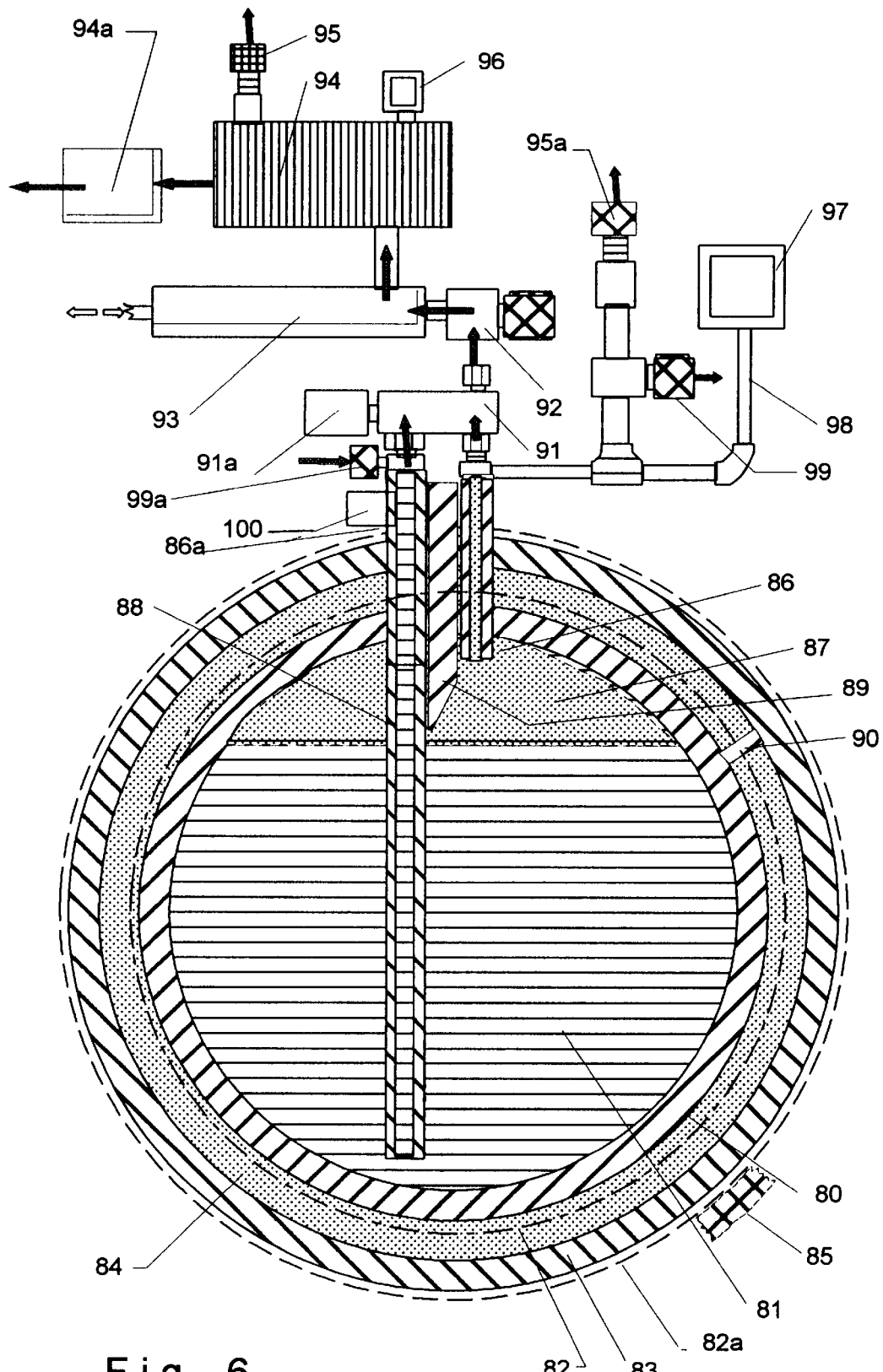

The illustrated fuel cell system comprises an array of twelve hydrogen-oxygen fuel cells (see particularly FIG. 1), together with a hydrogen storage system (see FIG. 6).

The Fuel Cells

Figure 1:
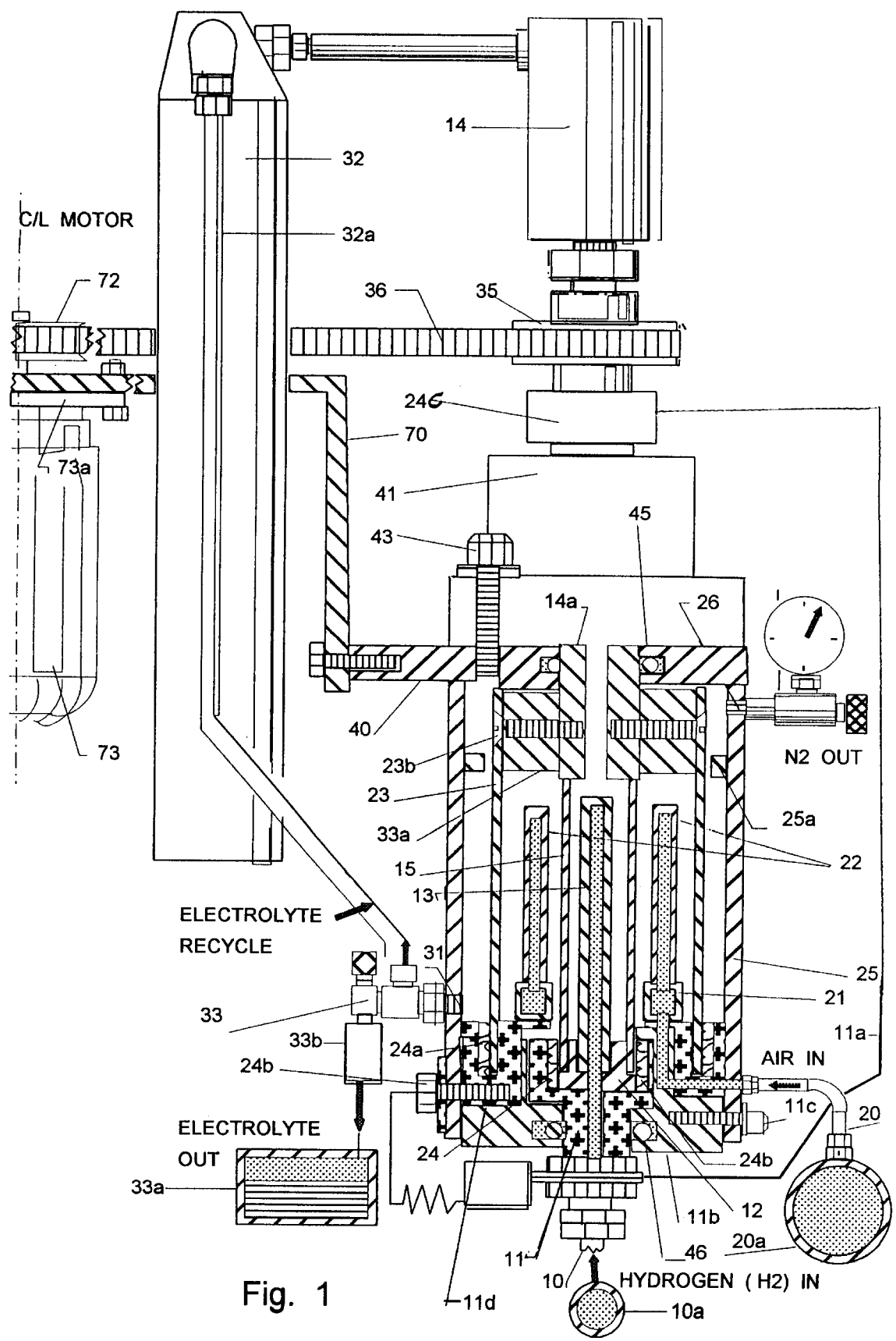

Each fuel cell in the embodiment of FIG. 1 of the present invention comprises an inlet 10 for hydrogen fuel. The hydrogen fuel is provided from a manifold 10a that feeds all twelve cells. The hydrogen fuel passes through a rotary union formed by the junction of a stationary flared copper tube 11 and a rotating cap 12 into a rotating assembly further comprising an axial stainless steel hydrogen electrode or sparger 13, having 0.2 micron pores, one half inch diameter O.D., ⅜ inch I.D., six inches long, Mott 1400-500-0.375-6-0-0.2A or equal. The hydrogen electrode 13 is operated with hydrogen gas at a positive pressure relative to the pressure in a space around it, such that hydrogen gas is sparged into the electrolyte filled space. The rotating assembly rotates at approximately 1800 RPM when the fuel cell is developing substantially full power, and at approximately 40 RPM when little or no power is required from the fuel cell.

Figure 4:
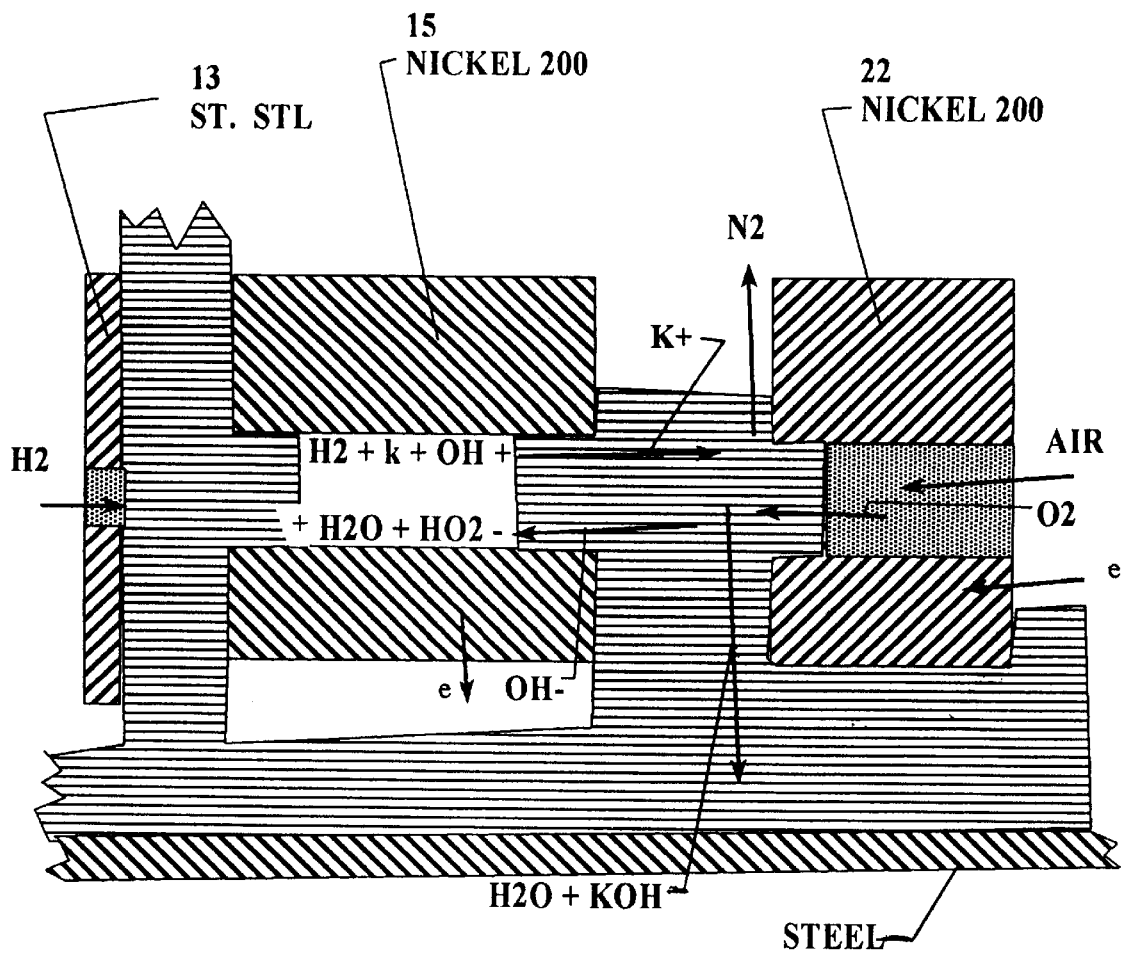

Electrolyte also enters the rotating assembly through a rotary union 14. This electrolyte enters, through a hollow shaft 14a, into the space between the hydrogen electrode or sparger 13 and a hydrogen catalyst electrode 15, that is electrically connected to the hydrogen electrode 13, and is fabricated from nickel 200, with 0.5 micron pores, 1 inch O.D., ¾ inch I.D., 6 inches long, Mott 1400-1.00-0.750-6-0-0.5H or equal. This electrolyte interacts with the hydrogen electrode 13, absorbing a few hydrogen and potassium ions therefrom and releasing electrons thereto, and also collects many fine bubbles of hydrogen gas therefrom. This electrolyte, with the fine hydrogen gas bubbles, then flows through the pores of the hydrogen catalyst electrode 15 (FIG. 4), where the fine hydrogen bubbles interact further with the hydrogen catalyst electrode, generating additional hydrogen ion and releasing additional electrons thereto.

Each pore is approximately 0.5 microns in diameter, in metal 0.15 inches thick, each pore therefore has an approximate length to diameter ratio of about 7500 to 1. At least part of the improved efficiency of the fuel cell of the present invention is believed to result from some catalytic activity of the nickel surface within the pore.

Oxygen or purified air containing oxygen enters the apparatus through an oxygen manifold 20a that feeds all twelve cells. Oxygen from manifold 20a enters each individual cell through a gas inlet 20 into a nonrotating cell manifold 21, of half inch square section and fabricated from one sixteenth inch thick porous nickel with 2 micron pores. The cell manifold feeds twelve porous nickel cups 22, each fabricated of 0.375 inch outer diameter, 0.250 inch inner diameter, 4 inch long porous nickel tubing having 2 micron pores, disposed about the circumference of the rotating hydrogen catalyst electrode 15. Some of the hydrogen and potassium ions in the electrolyte interact with the oxygen at the manifold and cups to absorb electrons, converting the hydrogen ion into water and the potassium ions into potassium oxide. Any potassium oxide formed interacts with water to regenerate potassium hydroxide. In addition, some negative peroxide and hydroxyl ions are formed at the oxygen electrode, which in turn interacts with hydrogen at the hydrogen catalyst electrode. The rotation of an oxygen catalyst electrode 23 about, and the hydrogen catalyst 15 electrode within, the ring of cups 22 causes much mixing of the electrolyte and transport of ions between the electrodes.

The oxygen or air within the cups 22 and the cell manifold 21 is at a pressure greater than the pressure of the electrolyte in the space about the cups, such that a plurality of oxygen or air bubbles are formed within the electrolyte. Additional potassium and hydrogen ion in the electrolyte reacts with the oxygen in these oxygen or air bubbles as they pass through the pores in the wall of the rotating oxygen catalyst electrode 23, which is formed of a three-inch O.D., 2-7/8 inch I.D., 6 inch long Nickel 200 tube having 2 micron pores. This air or oxygen is supplied from the atmosphere through a filter 49 (FIG. 3) having a pore size smaller than the pores in the porous nickel cups and the oxygen catalyst electrode, and pressurized by a belt driven compressor 48.

The rotating oxygen catalyst electrode 23 is attached to and rotates with a plastic insulator 33a by a plurality of nylon nonconductive bolts 23b. The plastic insulator 33a is in turn attached to and rotates with the rotating shaft 14a by bolts 23b. Hydrogen catalyst electrode 15 is welded to and rotates with the shaft 14a.

Electrons flow from the hydrogen electrode and the hydrogen catalyst electrode across the sliding interface of cup 12 to flared copper tube 11, and also through a pair of electrical slip rings 24 and 24c and a suitable brush. These electrons proceed on to the next adjoining cell assembly through conductor 11a, and after passing through all cells and a load return through bolts 24b, cathode housing 25, and copper ring 11d into manifold 25, oxygen sparger cups 22, and through a silver slip ring and suitable brush 24a into the rotating oxygen electrode 23.

After the electrolyte flows through the oxygen catalyst electrode 23, into a space between electrode 23 and a housing lower portion 25, remaining gas bubbles are separated by centrifugal force out of the electrolyte and are vented through a gas outlet port 26 in housing lower portion 25. A pressure gauge 27 and regulator 28 are fitted to the outlet port 26, thereby permitting control of the operating pressure of the cell.

Ring 25a serves as a centrifugal gas-liquid separator and bars liquid flow to the gas outlet port 26. Used liquid electrolyte exits the cell through liquid port 31 near the bottom of the cell This gives gas-liquid separation for the used electrolyte and unreacted nitrogen.

Liquid electrolyte leaves the housing lower portion 25 through an electrolyte port 31. This electrolyte circulates through a filter 32 to the rotating union 14, whereupon the electrolyte repeats the above described cycle. No separate electrolyte circulating pump is required because the rotating elements of the cell effectively serve as a centrifugal pump to pump the electrolyte. The inventor has measured pressures at the electrolyte outlet of a cell from 35 to 65 psi higher than the pressure at the electrolyte inlet of a cell. Some electrolyte may be removed through an electrolyte drain port 33 when the hydrogen oxide (water) reaction product accumulates in the aqueous potassium hydroxide electrolyte. Removed electrolyte is stored in electrolyte tank 33a.

The cell is further equipped with a pulley 35 that drives the rotating assembly, including the hydrogen sparger 13, hydrogen catalyst electrode 15, the oxygen catalyst electrode 23, and plastic insulator 33a when driven by a belt 36. The rotating assembly is mounted to a plastic insulating housing upper portion 40 with a bearing 41 that stabilizes the rotating assembly in the housing. Housing upper portion 40 is bolted to housing lower portion 25 with standard steel bolts 43. A seal 45 between hollow shaft 14a and housing upper portion 40 prevents the escape of gas and electrolyte from the cell along the shaft, and a second seal 46 prevents gas escape along the bottom portion of the rotating assembly.

Figure 2:
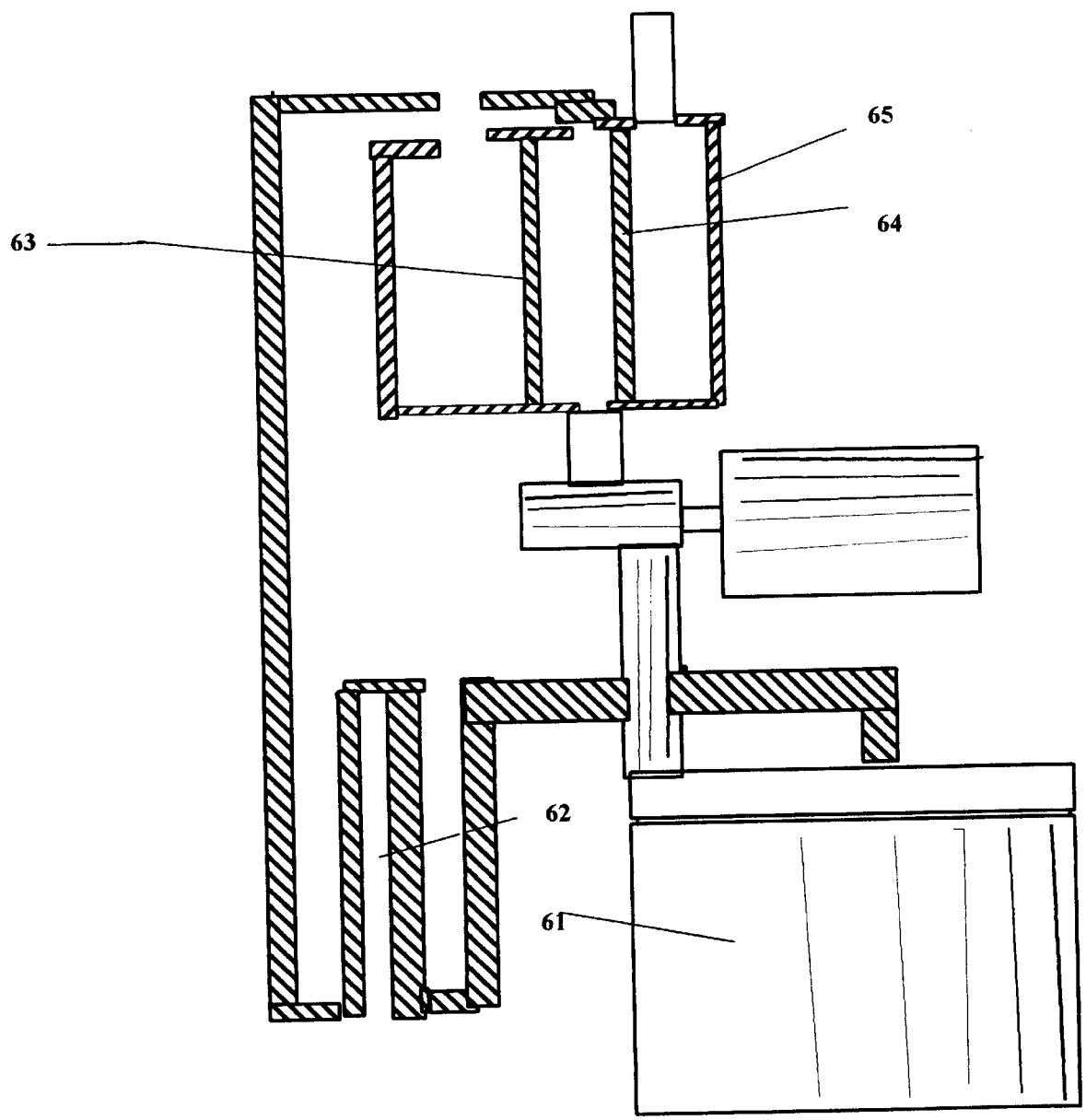

The difference between the fuel cell of the present invention as embodiment of FIG. 1 and a typical prior art fuel cell can be best visualized by reference to a drawing of a typical fuel cell (FIG. 2). In a typical prior art fuel cell system having a potassium hydroxide electrolyte, there is an electrolyte circulating pump 60, an electrolyte filter 61, a radiator 62 for controllably removing waste heat from the system, and at least one fuel cell. The electrolyte filter 61 and radiator 62 of the typical system correspond to the filter 32 of the present invention. The typical fuel cell comprises a porous fuel electrode 63 and a porous oxidizer electrode 64, but these electrodes are stationary with respect to the cell housing 65 in a typical cell, and there is no use of centrifugal forces within the cell to assist or force electrolyte flow in a typical prior art cell. The rotating electrode cell of the present invention yields substantially more power per square foot of active area than prior art cells because of improved utilization of the area within the pores of the catalyst electrodes, the high flow of electrolyte through the cell, and the mixing of electrolyte induced by rotation of the electrodes. Mixing of the electrolyte overcomes concentration polarization within the cell. Improved utilization of the area within the pores of the catalyst electrodes overcomes activation polarization and reduces the operating temperature required for cell operation.

Twelve cells of the rotating electrode design are attached to a support plate 70. The driving belt 36 (FIG. 3) is wrapped about the driving pulleys 35 of each cell in a zigzag pattern such that all twelve pulleys 35 and air pump pulley 37 are driven. Half of pulleys 35 rotate clockwise, the other half rotate counterclockwise. The belt 36 is driven by a motor pulley 72 and a two horsepower electric motor 73, or as required. Preferably this motor is a 50–250 VDC, 100–5000 RPM motor mounted with bolts in slotted holes for belt tightening. The power output of the system is roughly proportional to the speed of this motor. The pulleys are sized such that the rotating assembly of each cell rotates at about 1800 RPM when this motor is operating at full speed.

Figure 5:
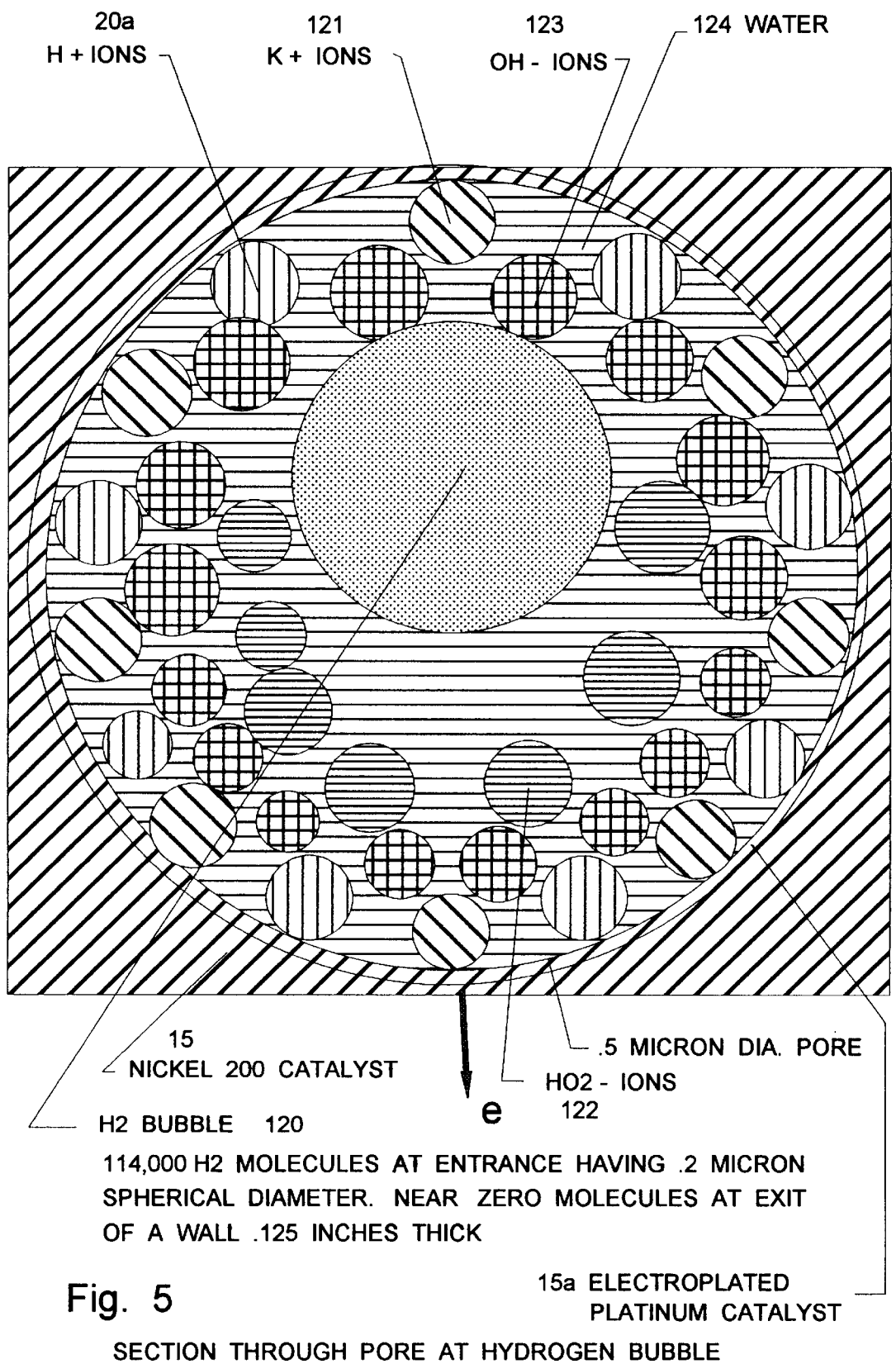

A hydrogen bubble 120 will often be found within the mouth of a pore (FIG. 5) in the porous nickel hydrogen catalyst electrode 15. These bubbles are in close proximity to hydrogen ions 20a, potassium hydroxide molecules 121, HO2-ions 122, OH-ions 123, water 124, and nickel catalyst 15. It is believed that the reactions occur primarily within an active region within, but close to the outlet end of, the pore as shown on FIG. 4. Similarly, the oxygen electrode active region is believed to be on the oxygen cups and at the inlet end of the pores in the oxygen electrode.

Hydrogen Supply System

The hydrogen storage subsystem of the fuel cell system of the present invention has a spherical inner hydrogen storage tank 80 (FIG. 6), typically two feet in diameter. This tank is partially filled with liquid hydrogen 81. Tank 80 is surrounded by an aluminum reflector 82 having surface dimples such that most of its surface is at a forty-five degree angle relative to its circumference. This reflector serves to reflect infrared radiation that would otherwise transmit heat into the tank 80. Outside the reflector 82 is a steel outer tank shell 83, separated from reflector 82 by a space 84. Space 84 is evacuated and contains no oxygen or nitrogen, thereby preventing heat flow into the tank 80 through condensation of those gasses thereon or by convection.

Steel outer tank shell 83 is surrounded by an additional aluminum reflector 82*a*, and at least approximately three inches of CRYO LITE fiberglass insulation 85 for heat insulation and for improving shock resistance by padding the tank. A first ceramic tube 86 extends into the top of the tank 80, into an area above the top of the liquid hydrogen 81 filled with gaseous hydrogen 87. A second ceramic tube 86*a* extends into the tank, where it is brazed to a steel tube 88 that extends to the bottom of the tank, at the bottom of the liquid hydrogen 81. These tubes are made of fused silica or equal. A fused silica gusset 89 is brazed to both ceramic tubes 86 and 86*a* to strengthen them and thereby prevent fracture of the tubes as the tank is subjected to acceleration. Additionally, there are at least five stabilized fused silica spacers 90 brazed to tank 80, and positioned about the tank 80 to transmit lateral and vertical forces between the outer tank shell 83 and tank 80.

When hydrogen is required by the fuel cells, gaseous hydrogen 87 is drawn from the tank 80 through the short fused silica tube 86. The hydrogen flows from transfer valve 91 through a shut off valve 92, a metering device 93, a heat exchanger 94, and through a metering pump 94*a* before entering the fuel cell system through the gas inlet manifold 10*a*. A pressure sensor 97 monitors the pressure of the gaseous hydrogen, and relief valves 95 and 95*a* limit the pressure in the tank 80 and the heat exchanger 94 to a safe value.

When the pressure as measured by the pressure sensor 97 falls to a value near the minimum hydrogen gas pressure required to operate the fuel cells, a solenoid 91a operated transfer valve 91 disables hydrogen flow from the short fused silica tube 86, permitting liquid hydrogen 81 to flow through steel tube 88 and fused silica tube 86*a*. The hydrogen liquid or gas flows from transfer valve 91 through the metering device 93, to the heat exchanger 94 where any hydrogen liquid is evaporated into gas and warmed to a temperature close to the ambient temperature, and through the metering pump 94a before entering the fuel cell system.

The hydrogen tank is filled through a quick-connect connection 99*a* that admits liquid hydrogen from a fueling station reservoir into fused silica tube 86*a* and steel tube 88. Boiloff exits the tank through fused silica tube 86. During fueling operations, this boiloff exits the tank system through a second quick-connect connection 99 and is recovered by a compressor associated with the fueling station.

The level of liquid hydrogen fuel in the tank is measured through an ultrasonic transducer 100 and a microprocessor (not shown). The microprocessor causes transducer 100 to transmit a pulsed vibration into the fused silica tube 86*a* and steel tube 88. A portion of the pulsed vibration will be reflected from the point along steel tube 88 where the steel tube enters the hydrogen liquid 81. Additional reflections will occur at the interface of fused silica tube 86*a* with the steel tube 88, and the interface of the fused silica tube 86*a* with gusset 89. The ultrasonic transducer also monitors the reflections of the pulsed vibration, and the microprocessor subtracts the reflections of an empty tank. The microprocessor then determines the location along steel tube 88 of the reflection due to the level of hydrogen liquid 81, and determines the quantity of fuel remaining in the tank. Alternatively, a float-based gauge may be used.

The Vehicle System

Figure 7:
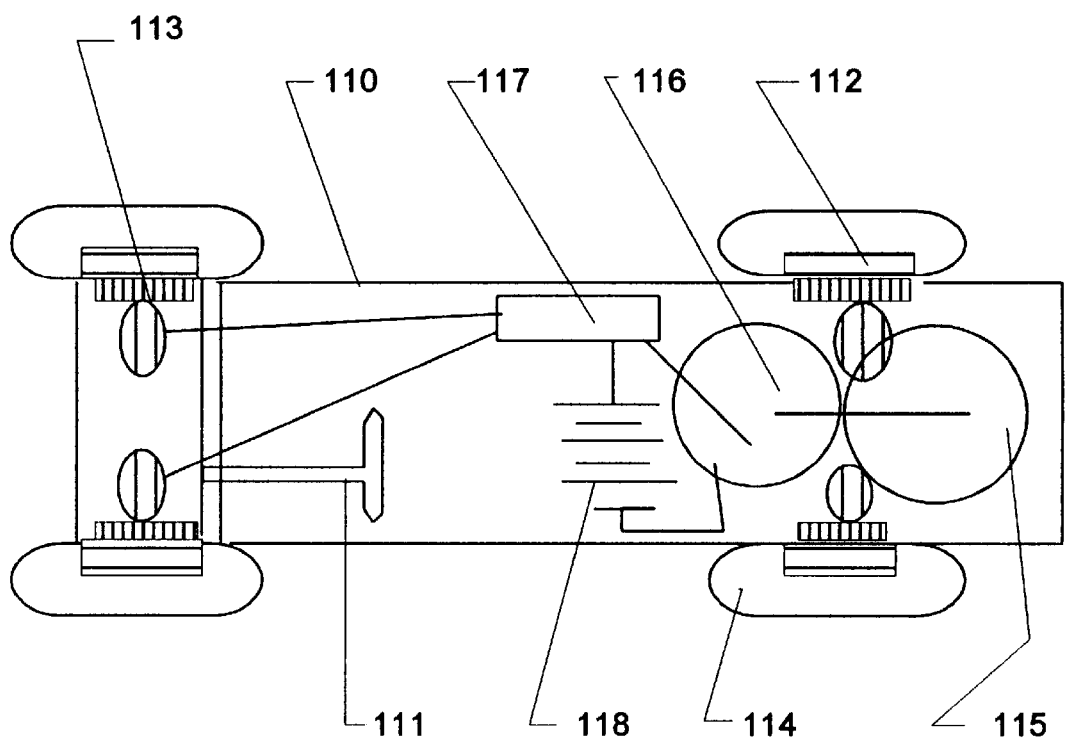

A vehicle of the present invention has a conventional chassis 110 (FIG. 7), with conventional vehicle controls including a steering system 111 and a braking system 112 such as are well known in the motor vehicle art. The vehicle also has at least one electric propulsion motor 113 coupled to propel the vehicle by driving at least one wheel 114, in the preferred embodiment there is one electric propulsion motor 113 for each wheel 114 of the vehicle, the vehicle having four wheels.

Figure 3:
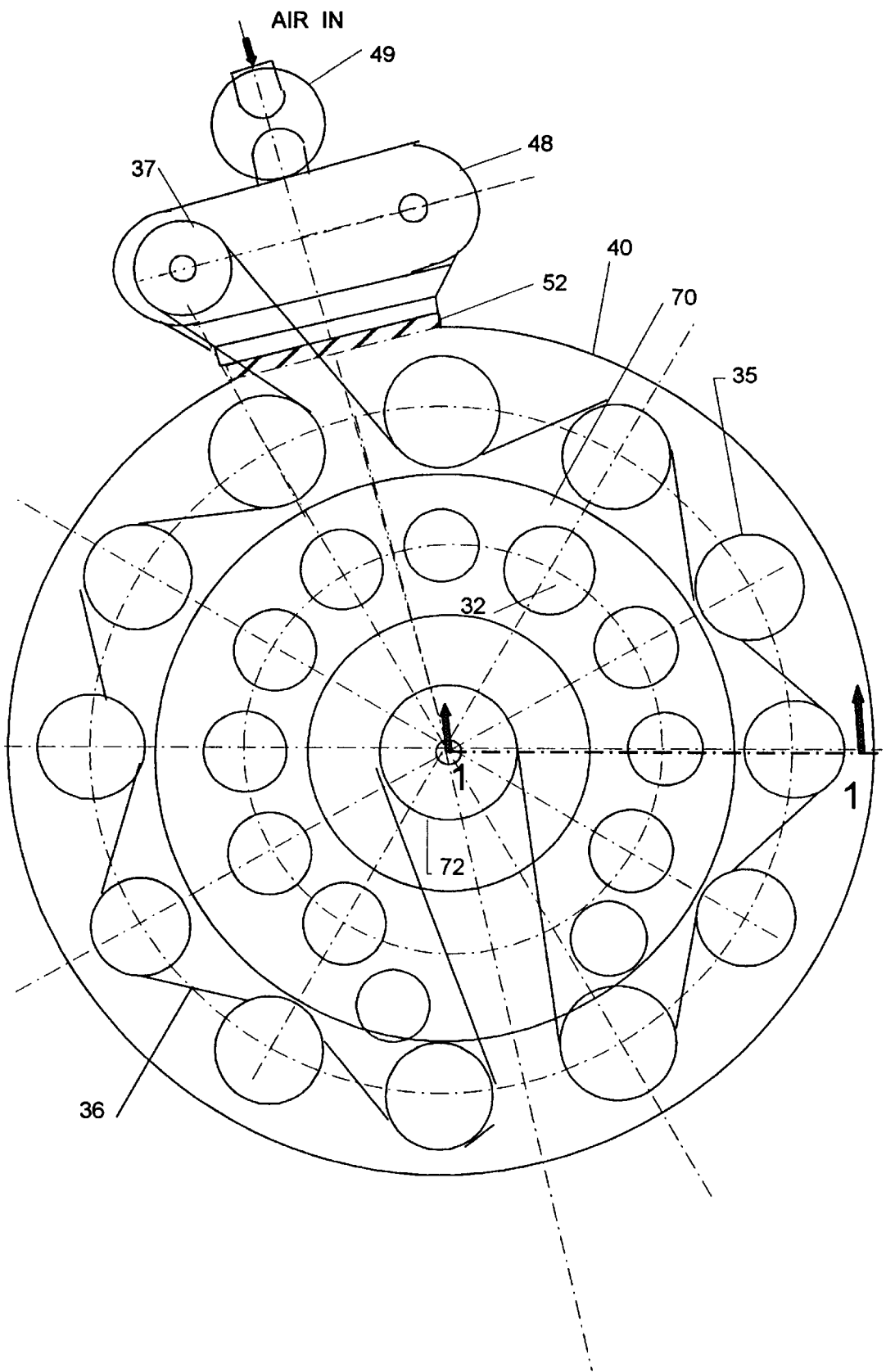

The vehicle further comprises the storage system 115 for liquid hydrogen fuel as disclosed in FIG. 6, coupled to provide hydrogen fuel to the fuel cell system 116, as disclosed in FIGS. 1 and 3. The fuel cell system 116 is coupled to provide power to vehicle inverter and motor control electronics 117, and to charge a peaking battery 118. The peaking battery 118 is also coupled to provide power to the vehicle inverter and motor control electronics 117. The vehicle inverter and motor control electronics 117 is in turn coupled to provide power, which may be an alternating current or in the preferred embodiment is a high voltage direct current, to the electric propulsion motor(s) 113.

The peaking battery 118 is comprised of conventional high current battery cells, such as are well known in the battery art. This battery provides power to the vehicle inverter and motor control electronics 117 during times when high power is required at the at least one vehicle propulsion motor 113, such as during periods of high acceleration or hill climbing. Battery 118 is recharged by power from the vehicle propulsion motor 113 during regenerative braking, or from the fuel cell system 116 during times where the power demand of the vehicle propulsion motor 113 is less than the power output of the fuel cell system 116.

While the present fuel cell system utilizes twelve fuel cells wired in series, the present invention may be embodied with other numbers of fuel cells greater than or equal to one. The efficiency of the power conversion electronics depends on the voltage supplied by the fuel cells, and is greater when several cells are wired in series than when only one cell is used.

While the rotating electrodes of the cell of the present invention has been described as providing centrifugal forces serving as the means for causing the electrolyte to flow, it is understood that one or more electrolyte pumps may be used. In an alternative embodiment, a multichannel peristaltic pump having nonconductive tubing pumps spent electrolyte from outside the oxygen electrodes of each of several rotating electrode cells into an electrolyte filter common to all of the cells, and a second multichannel peristaltic pump having nonconductive tubing pumps filtered electrolyte from the filter to the hydrogen sparger of each of the cells.

While the catalytic electrodes of the present device have been described with reference to nickel both as a structural material and as the catalytic material of the catalyst electrodes, it is recognized that catalyst electrodes may be fabricated from such other materials as platinum group metals or gold. Alternatively, the nickel hydrogen catalyst electrode 15 and the oxygen catalyst electrode 23 may incorporate active sites 15*a* comprising a platinum group metal such as platinum or palladium electrodeposited on and within the pores of the porous nickel electrodes. Care must be taken that the platinum not excessively obstruct the pores of the porous electrodes.

Whereas the rotating electrode fuel cell has been described with reference to operation on hydrogen gas and air containing oxygen, it is understood that the cell can operate on purified oxygen also. Further, it is understood that a rotating electrode fuel cell can be constructed to operate on gaseous fuels other than hydrogen, although this may require operation with an electrolyte other than the aqueous solution of potassium hydroxide herein disclosed.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A fuel cell for generating electricity by reacting a gaseous fuel with oxygen, comprising:
   a fuel electrode assembly disposed within a housing and comprising a porous fuel catalyst electrode rotatable within the housing and a fuel sparger for introducing bubbles of a fuel into surrounding electrolyte;
   an oxygen catalyst electrode assembly disposed within said housing and comprising a porous oxygen catalyst electrode rotatable within the housing and an oxygen sparger for introducing bubbles of oxygen into surrounding electrolyte; and
   a body of fluid electrolyte within said housing in contact with the fuel electrode assembly and with the oxygen electrode assembly.

2. A fuel c ell for generating electricity by reacting a gaseous fuel with oxygen, comprising:
   a fuel electrode assembly disposed within a housing and comprising a porous fuel catalyst electrode rotatable within the housing and a fuel sparger for introducing bubbles of a fuel into surrounding electrolyte;
   an oxygen electrode; and
   a body of fluid electrolyte within said housing in contact with the fuel electrode assembly and with the oxygen electrode.

3. The fuel cell of claim 2, further comprising a filter having a pore size smaller than the pore size of the fuel catalyst electrode, and wherein the filter removes carbonate particles from electrolyte passed therethrough.

4. A fuel cell wherein a liquid electrolyte is flowed therethrough to consume a gaseous fuel, said fuel cell comprising:
   apparatus for introducing a plurality of bubbles of gaseous fuel into the electrolyte flowing through the fuel cell;
   a rotatable porous fuel catalyst electrode positioned in the fuel cell for contact by said electrolyte flowing through the fuel cell; and
   apparatus for rotating said fuel catalyst electrode so as to move bubbles of said gaseous fuel to and through at least some of the pores of said fuel catalyst electrode.

5. The fuel cell of claim 4, wherein the gaseous fuel is hydrogen.

6. The fuel cell fuel electrode of claim 4, wherein the fuel catalyst electrode comprises a body of porous nickel having an active layer of a platinum group metal deposited within but not obstructing the pores of the porous nickel.

7. The fuel cell of claim 6, wherein the gaseous fuel is hydrogen.

8. The fuel cell of claim 4 further comprising:
   an oxygen electrode.

9. A vehicle comprising:
   at least one electric motor adapted to rotate a wheel of the vehicle and to thereby propel the vehicle;
   at least one fuel cell according to claim 4; and
   power conversion electronics adapted to accept electrical energy from the at least one fuel cell and to feed electrical energy to the at least one electric motor.

10. The vehicle of claim 9, wherein the fuel cell also comprises an oxygen electrode positioned in the fuel cell for contact by the electrolyte flowing through the fuel cell.

* * * * *